(12) United States Patent
Adams et al.

(10) Patent No.: US 9,630,547 B2
(45) Date of Patent: Apr. 25, 2017

(54) RETRACTABLE SHELTER FOR PROVIDING PROTECTED SPACE ALONGSIDE A RECREATIONAL VEHICLE HAVING A SLIDEOUT COMPARTMENT

(71) Applicants: Michael Adams, Tulsa, OK (US);
Michael J. Potvin, Tulsa, OK (US)

(72) Inventors: Michael Adams, Tulsa, OK (US);
Michael J. Potvin, Tulsa, OK (US)

(*) Notice: Subject to any disclaimer, the term of this patent is extended or adjusted under 35 U.S.C. 154(b) by 0 days.

(21) Appl. No.: 14/812,851

(22) Filed: Jul. 29, 2015

(65) Prior Publication Data

US 2017/0028899 A1 Feb. 2, 2017

(51) Int. Cl.
*B60P 3/00* (2006.01)
*B60P 3/34* (2006.01)

(52) U.S. Cl.
CPC .................... *B60P 3/341* (2013.01)

(58) Field of Classification Search
CPC ............................... B60P 3/341; E04H 15/06
USPC .................. 296/161, 165, 172, 176
See application file for complete search history.

(56) References Cited

U.S. PATENT DOCUMENTS

| 3,457,684 | A | * | 7/1969 | Wood, Jr. | E04H 15/20 |
| | | | | | 52/2.21 |
| 3,697,123 | A | * | 10/1972 | Gygrynuk | B60P 3/14 |
| | | | | | 135/88.1 |
| 3,923,336 | A | * | 12/1975 | Price, Sr. | B60P 3/341 |
| | | | | | 135/114 |
| 4,754,774 | A | * | 7/1988 | Leader | E04H 15/06 |
| | | | | | 135/120.2 |
| 7,464,983 | B1 | * | 12/2008 | Acosta | E04H 15/06 |
| | | | | | 135/88.05 |
| 8,919,861 | B1 | * | 12/2014 | Smith | B60P 3/36 |
| | | | | | 296/159 |

\* cited by examiner

*Primary Examiner* — Joseph D Pape
(74) *Attorney, Agent, or Firm* — Russ Weinzimmer & Associates, PC

(57) ABSTRACT

A retractable shelter is provided for use with a slideout compartment of a recreational vehicle. The retractable shelter includes a sheet of flexible material capable of being rolled up into a retracted position; and a storage compartment capable of storing the sheet of flexible material rolled up into the retracted position. The storage compartment is attachable along and near a bottom edge of a slideout compartment of a recreational vehicle. Doors can also be attached to the extended sheet of flexible material underneath the slideout compartment. The sheet of flexible material can also be extended in a horizontal direction to support poles.

20 Claims, 11 Drawing Sheets

FIG. 8

RETRACTABLE SHELTER FOR PROVIDING PROTECTED SPACE ALONGSIDE A RECREATIONAL VEHICLE HAVING A SLIDEOUT COMPARTMENT

FIELD OF THE INVENTION

The present invention relates generally to recreational vehicles, and more particularly to recreational vehicles having slide-out compartments.

BACKGROUND OF THE INVENTION

A recreational vehicle (RV) is a motorized or towable vehicle that combines transportation and living quarters for travel, recreation and camping. RVs have been with us nearly as long as the automobile, and early RVs were typically constructed on a truck or automobile chassis. Originally designed for function, RVs often include a kitchen, a bathroom, and a sleeping area. In North America, RVs are growing increasingly luxurious, and include numerous premium features that are designed at providing maximum comfort for passengers and occupants. Once a weekend toy that was built in backyards and garages by do-it-yourselfers, RVs now include motorized, slideout compartments that, when the RV is parked, expand the usable area inside an RV by extending outward from the RV body to provide additional living space within the RV.

From the beginning, RVs have afforded travelers the ability to easily include outdoor items such as bicycles, patio furniture, barbeques, and other items that can be carried inside or attached to the outside of an RV on its roof or front or rear bumpers, and then set up near the RV at a campsite or other destination. With modern RVs, an extendible shelter of sorts is an added benefit of having slideout compartments; bicycles, barbecues and patio furniture can be placed under extended slideout compartments, which is somewhat useful when there is rain. However, an extended slideout compartment provides only an overhang shelter, leaving items under the overhang shelter still exposed to the elements and/or to the view of casual passers-by.

SUMMARY OF THE INVENTION

The present invention provides a retractable shelter including a sheet of flexible material that is stored as a roll inside a storage compartment attached to a slideout compartment on a recreational vehicle that unrolls to form various shelter configurations such as a vertical wall extending downward from the edge of the slideout compartment, or a lean-to shelter if the sheet is secured to the ground at a horizontal distance from the extended slideout compartment, or a roof when extended in a horizontal direction from the extended slideout compartment and supported vertically on poles.

One general aspect of the invention is a retractable shelter for use with a slideout compartment of a recreational vehicle. The retractable shelter includes: a sheet of flexible material capable of being rolled up into a retracted position; and a storage compartment capable of storing the sheet of flexible material rolled up into the retracted position, the storage compartment being attachable along and near a bottom edge of a slideout compartment of a recreational vehicle.

In some embodiments, the sheet of flexible material has a leading edge that moves away from the storage compartment when the sheet is unrolled and extended; and the leading edge of the sheet includes securing straps incorporated at a plurality of points along its length.

In some embodiments, the securing straps are configured in pairs that can be fastened to each other around a securing stake placed in the ground below the slideout compartment.

In some embodiments, the pairs of securing straps incorporate a hook-and-loop fastener system.

In some embodiments, the pairs of securing straps are configured to attach to each other in a breakaway configuration such that retracting the slideout compartment pulls the pairs of straps apart from each other.

In some embodiments, the retractable shelter also includes a pair of doors fastened to the flexible sheet when the flexible sheet is unrolled from the storage compartment into an extended position.

In some embodiments the retractable shelter also includes a pair of poles fastened to the flexible sheet when the flexible sheet is unrolled from the storage compartment into an extended position.

In some embodiments, at least a portion of the flexible sheet is transparent.

In some embodiments, the flexible sheet includes first and second side edges and a leading edge that define a periphery of the flexible sheet when unrolled from the storage compartment into an extended position, and the side edges and leading edge include securing points placed along the periphery. In further embodiments, the securing points include apertures configured to accept support poles when the flexible sheet is unrolled from the storage compartment in a substantially horizontal direction. In other further embodiments, the securing points include apertures configured to accept a securing line.

Another general aspect of the invention is a method of providing a shelter secured to a slideout compartment on a recreational vehicle. The method includes: extending a slideout compartment from a recreational vehicle; providing a rolled-up sheet of flexible material stored in a compartment attached to the slideout compartment on the recreational vehicle; unrolling a portion of the rolled-up sheet of flexible material; and extending the sheet of flexible material away from the edge of the slideout compartment; securing at least an edge of the portion of the rolled up sheet of flexible material to ground generally below.

In some embodiments, extending the sheet includes extending the sheet vertically downward to the ground. In further embodiments, extending the sheet includes extending the sheet outward and then downward to the ground to form a lean-to shelter.

In some embodiments, the method further includes attaching doors to the extended sheet underneath the slideout compartment.

In some embodiments, extending the sheet includes extending the sheet in a horizontal direction to support poles.

In some embodiments, extending the sheet also includes extending the sheet downward along support poles to form a roof and vertical wall connected to the roof.

In some embodiments, securing at least an edge of the portion of the rolled up sheet of flexible material to ground generally below includes securing the sheet to stakes placed in the ground.

In some embodiments, securing at least an edge of the portion of the rolled up sheet of flexible material to ground generally below includes providing securing straps configured in pairs along a leading edge of the sheet, and securing the pairs of straps to each other around a stake. In further embodiments, the pairs of straps are configured to attach to each other in a breakaway configuration such that retracting the slideout compartment pulls the pairs of straps apart from each other.

BRIEF DESCRIPTION OF THE DRAWINGS

Many additional features and advantages of the present invention are apparent from the following detailed description, when considered in conjunction with the drawings, in which.

DETAILED DESCRIPTION

Figure 1:
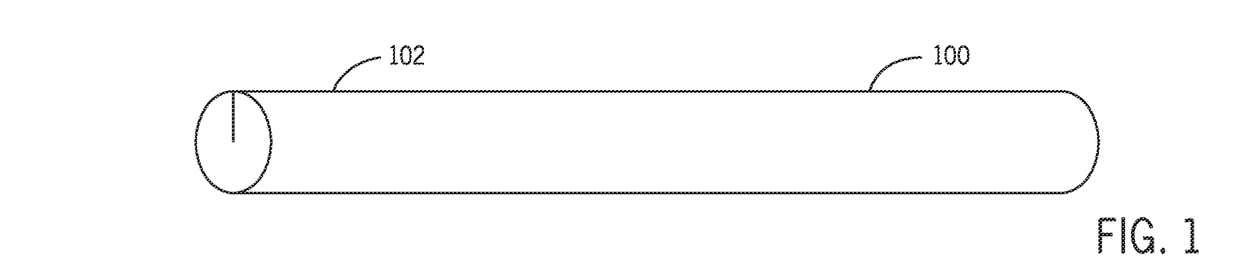
FIG. 1 is a perspective view of a retractable shelter of the invention in a retracted, stored configuration.

FIG. 1 shows retractable shelter 100 in a retracted, stored configuration. In an embodiment, shelter 100 includes a flexible sheet of material such as plastic, canvas, or other suitable material that can be rolled up and stored inside a tubular storage compartment 102.

Figure 2:
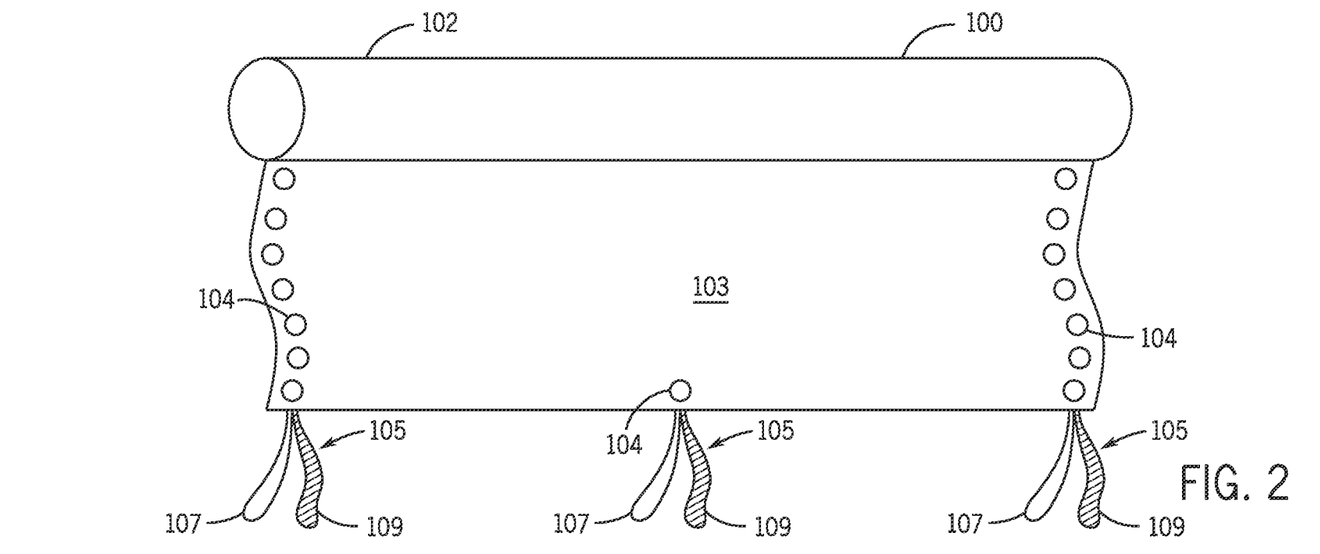
FIG. 2 is a perspective view of the retractable shelter of FIG. 1 in an extended unrolled configuration.

FIG. 2 shows the flexible material 103 extended from compartment 102 in an unrolled position. As shown, numerous grommets 104 line the edges of material 103 for fastening flexible material 103 to poles or stabilizing, tie-down lines. Also included in FIG. 2 is a plurality of tie-down straps 105 located on the leading edge of flexible material 103. In an embodiment, tie-down straps have two members 107 and 109, which together form a hook-and-loop fastening system similar to fastening products produced under the Velcro™ brand.

Figure 3:
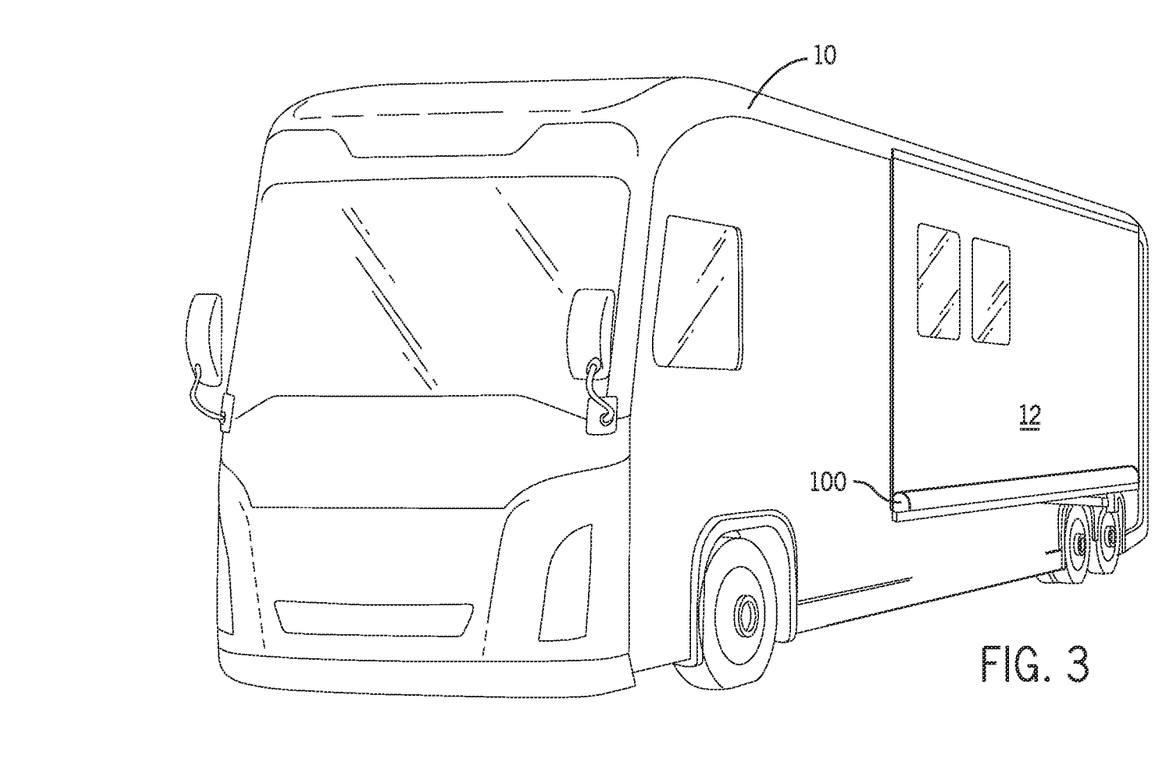
FIG. 3 is a perspective view of an RV having an undeployed slideout compartment with the retractable shelter of the invention in the retracted, stored configuration, the retractable shelter being attached to a lower portion of an outward-facing surface of the slideout compartment.

Directing attention to the FIG. 3, there is shown generally a recreational vehicle 10 including a slideout compartment 12 that supports a retractable shelter 100 in various configurations as used when slide-out compartment 12 is extended from the vehicle 10. FIG. 3 is a perspective view of vehicle 10 with slideout 12 retracted, and retractable shelter 100 attached to slideout compartment 12. As shown, vehicle 10 is ready for travel and retractable shelter 100 is in the stored position as shown in FIG. 1.

Figure 4:
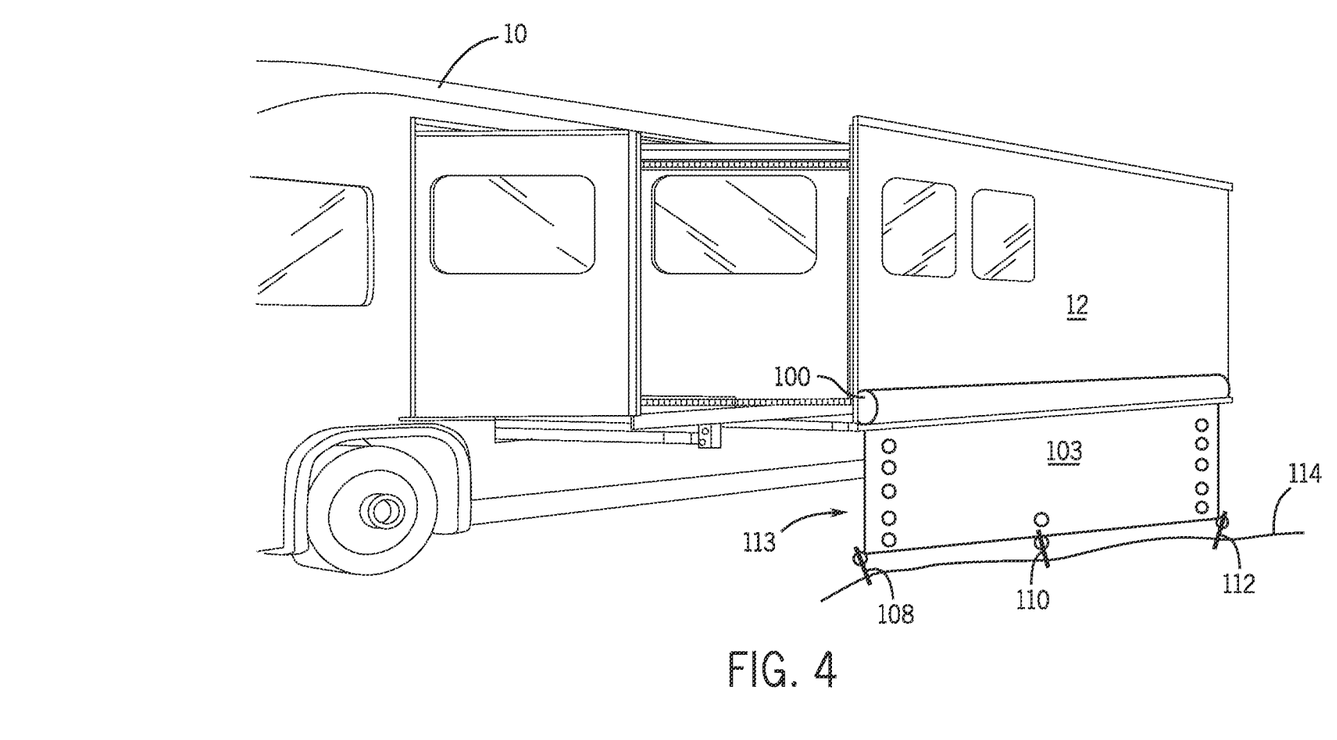
FIG. 4 is a perspective view of an RV having a deployed slideout compartment with the retractable shelter of FIG. 3 extended from the lower portion of the outward-facing surface of the deployed slideout compartment straight downward to the ground.

FIG. 4 is a perspective view of a retractable shelter 100 extended from the bottom edge of a slideout compartment 12 to the ground 114. As shown, flexible material 103 is exposed from retractable shelter 100 and is drawn straight down from slideout 12 and then attached to multiple stake-points 108, 110, and 112 in the ground 114 beneath slideout 12. In the embodiment shown in FIG. 4, retractable shelter 100 effectively shelters area 113 beneath slideout 12 both from weather and from view.

Figure 5:
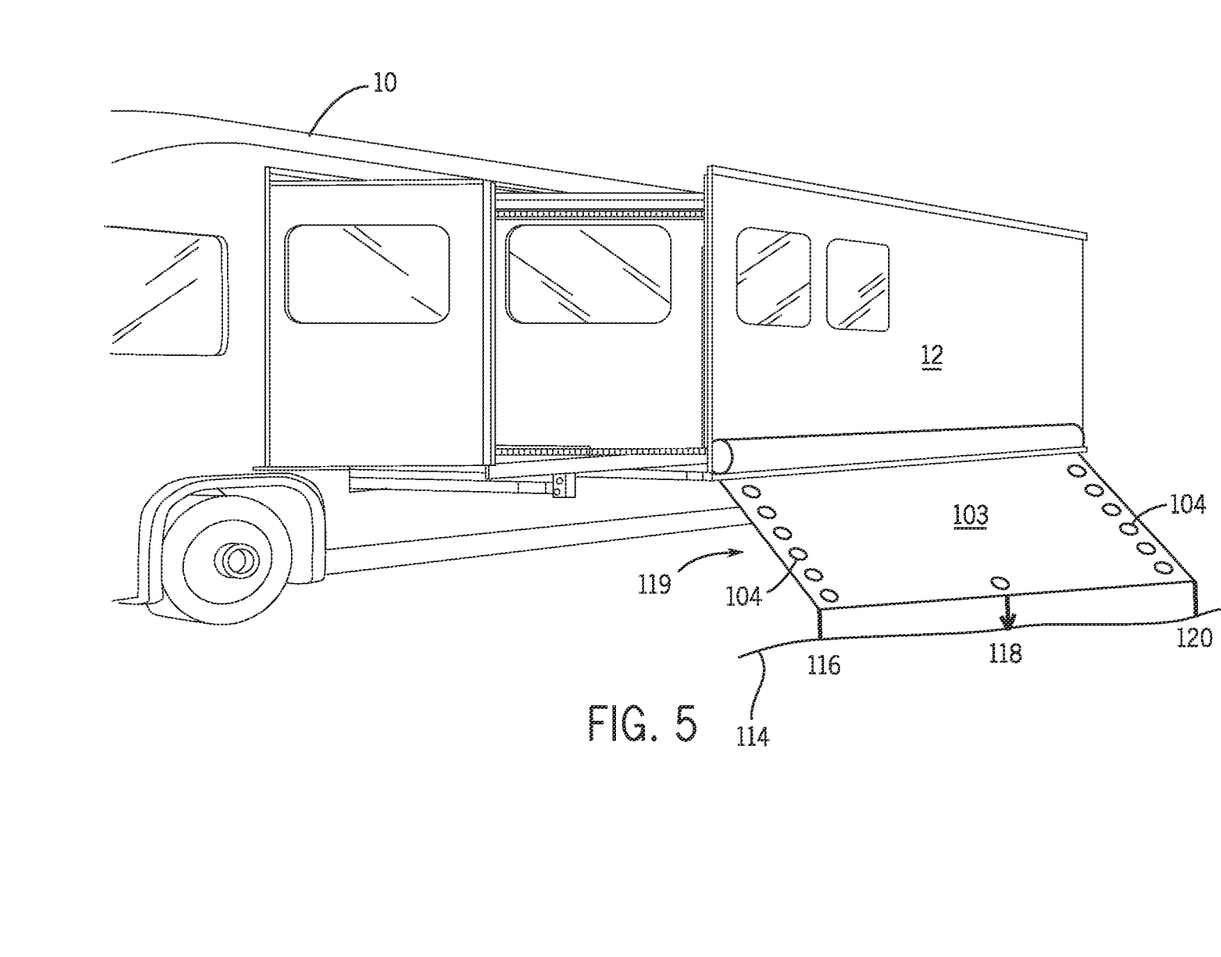
FIG. 5 is a perspective view of an RV having a deployed slideout compartment with the retractable shelter of FIG. 3 extended from the lower portion of the outward-facing surface of the deployed slideout compartment angled downward to a point on the ground further away from the RV than the lower portion of the slideout so as to provide a lean-to shelter.

FIG. 5 is a perspective view of retractable shelter 100 as shown in FIG. 4, but now staked to new stake points 116, 118, and 120, which creates a lean-to 122 that shelters a larger area 119 than that of area 113 of the straight pull-down application of retractable shelter 100 shown in FIG. 4.

Figure 6:
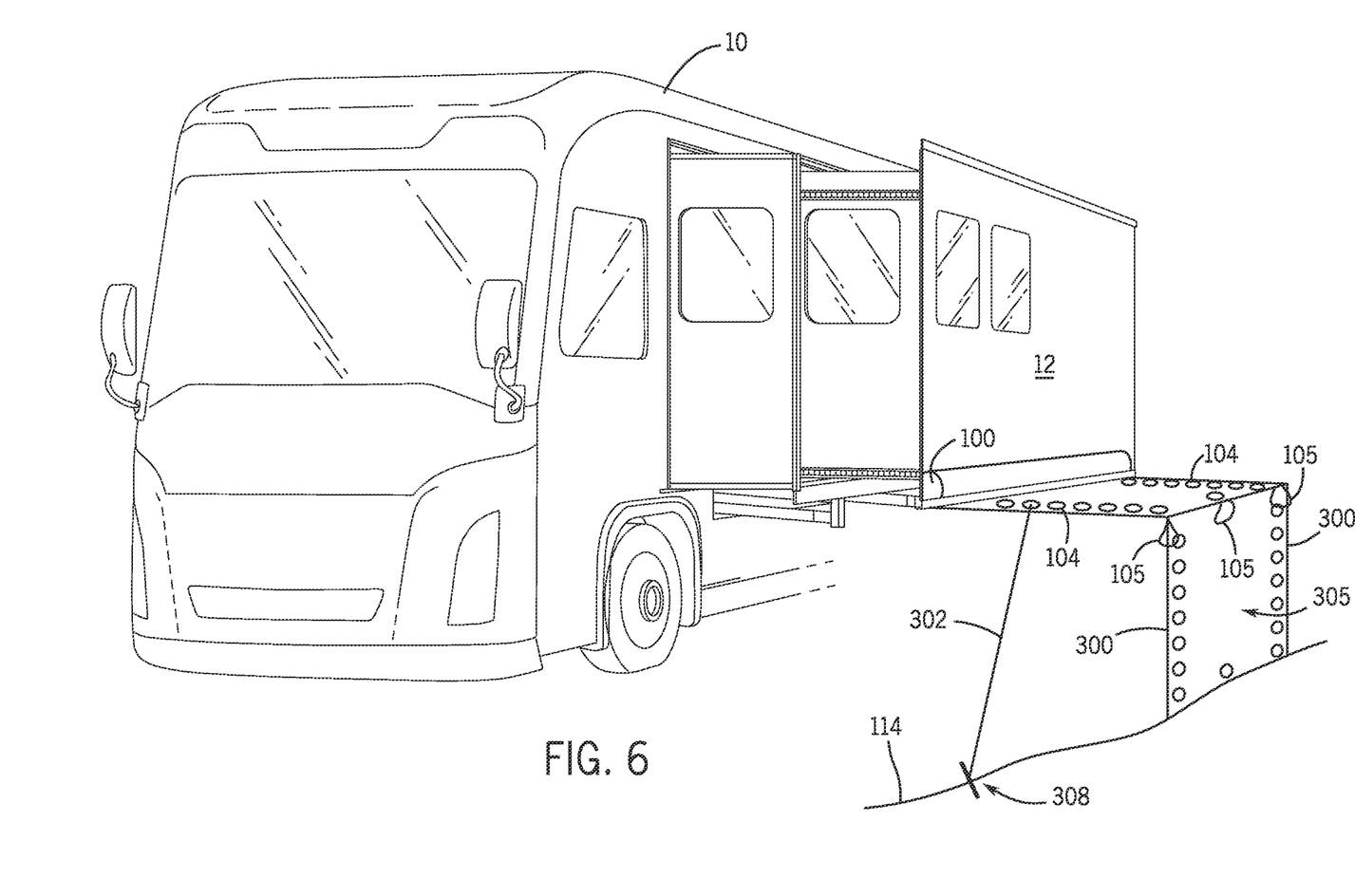
FIG. 6 is a perspective view of an RV having a deployed slideout compartment with the retractable shelter of FIG. 3 extended from the lower portion of the outward-facing surface of the deployed slideout compartment, straight outward to a set of poles, and then downward to a point on the ground for increased area beneath the shelter with open access from the side of the retractable shelter.

Referring to FIG. 6, even more area can be sheltered with the use of poles. FIG. 6 shows retractable shelter 100 extended horizontally and then supported by poles 300 for increased area beneath the shelter. In an embodiment, grommets 104 are placed along the edges of retractable shelter 100 so that they can serve as fastening points for support poles 300 as well as securing line 302. Securing line 302 can attach to the ground 114 at stake point 308. Poles 300 can be placed in the corners of retractable shelter 100 as shown, thus providing an open area 305 beneath retractable shelter 100.

Figure 7:
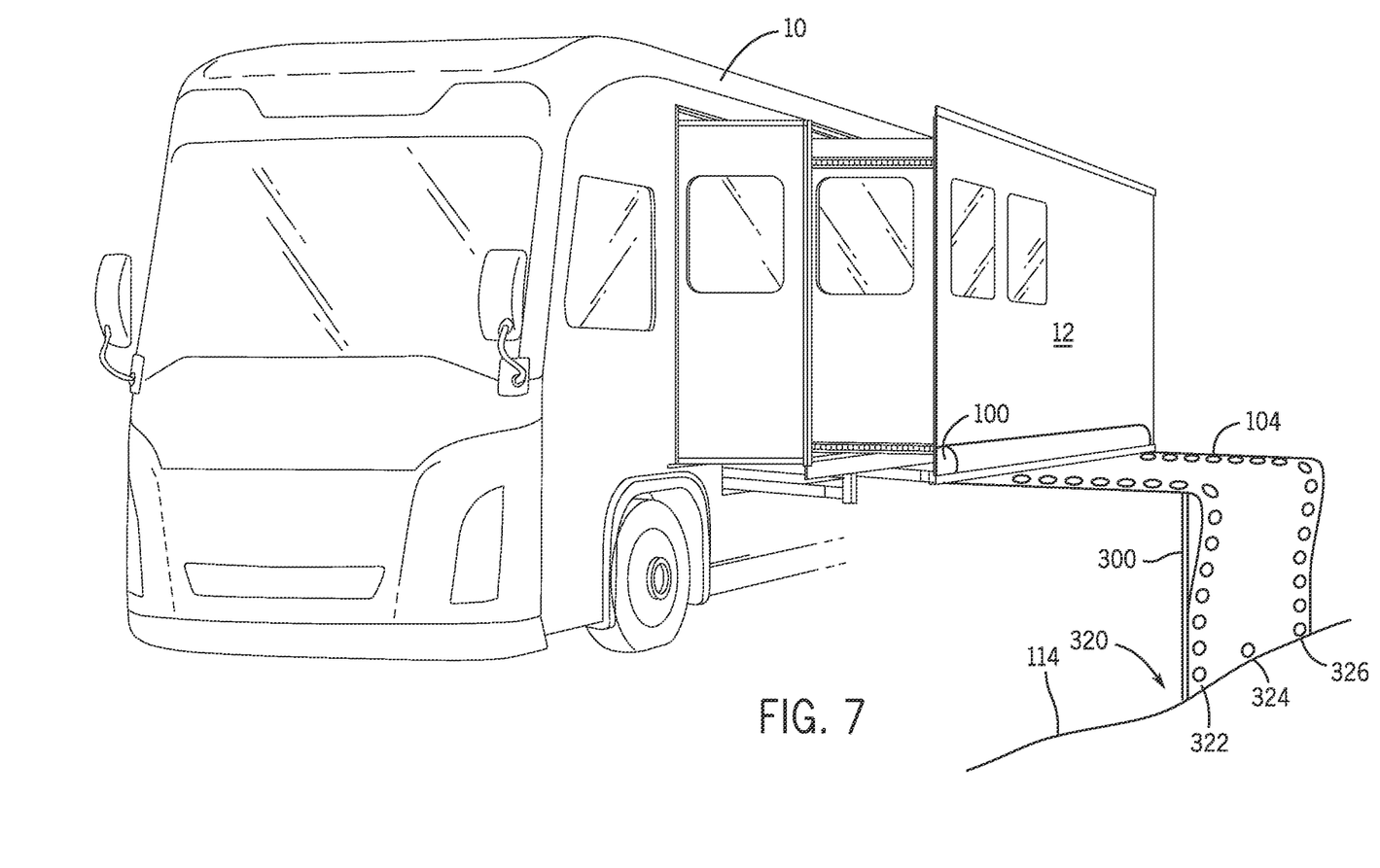
FIG. 7 is the perspective view of FIG. 6 with the retractable shelter again supported by poles, the retractable shelter being extended more so that a vertical face is extended outward from the top of the set of poles to the ground.

Referring to FIG. 7, the poles can be placed elsewhere along the edges so that the leading edge 320 of retractable shelter 100 is close to the ground 114 at stakepoints 322, 324, and 326.

Figure 8:
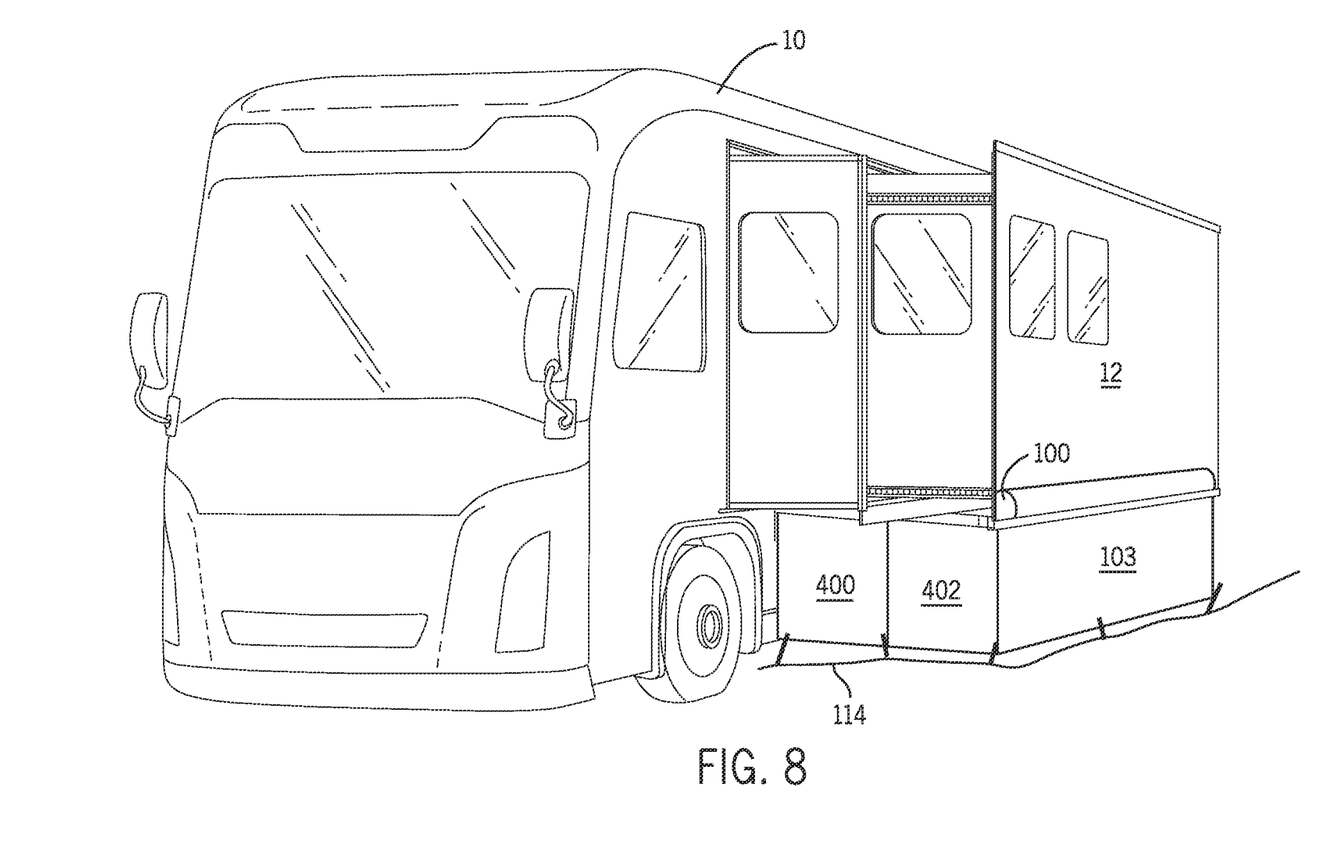
FIG. 8 is the perspective view of FIG. 4 of an RV having a deployed slideout compartment with the retractable shelter of FIG. 3 extended from the lower portion of the outward-facing surface of the deployed slideout compartment straight downward to the ground, with doors added to the retractable shelter.

FIG. 8 is the perspective view of FIG. 1 with doors 400 and 402 added to retractable shelter 100. Doors 400 and 402 can be attached to the bottom of slideout 12, and optionally staked to ground 114 with an untied opening between the two doors 400 and 402 for access to the sheltered area beneath slideout 12. In an embodiment, doors 400 and 402 can be located on both sides of retractable shelter 100.

Figure 9:
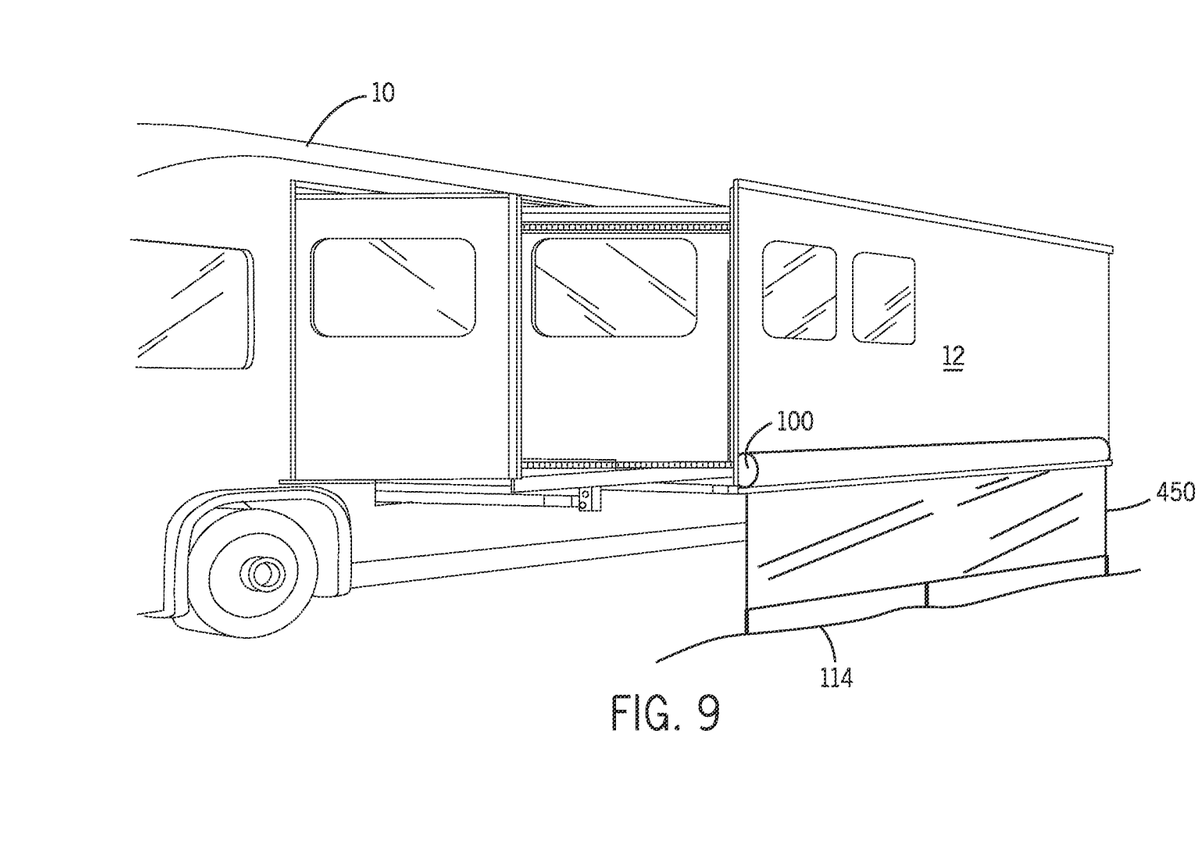
FIG. 9 is the perspective view of FIG. 4, showing the retractable shelter constructed from transparent material.

FIG. 9 is the perspective view of FIG. 4 with retractable shelter 100 constructed from transparent material 450. By using transparent material, such as screen material transparent plastic, retractable shelter 100 can serve as a greenhouse, or simply to provide sunlight to the sheltered area while keeping out rain, insects and birds.

Figure 10:
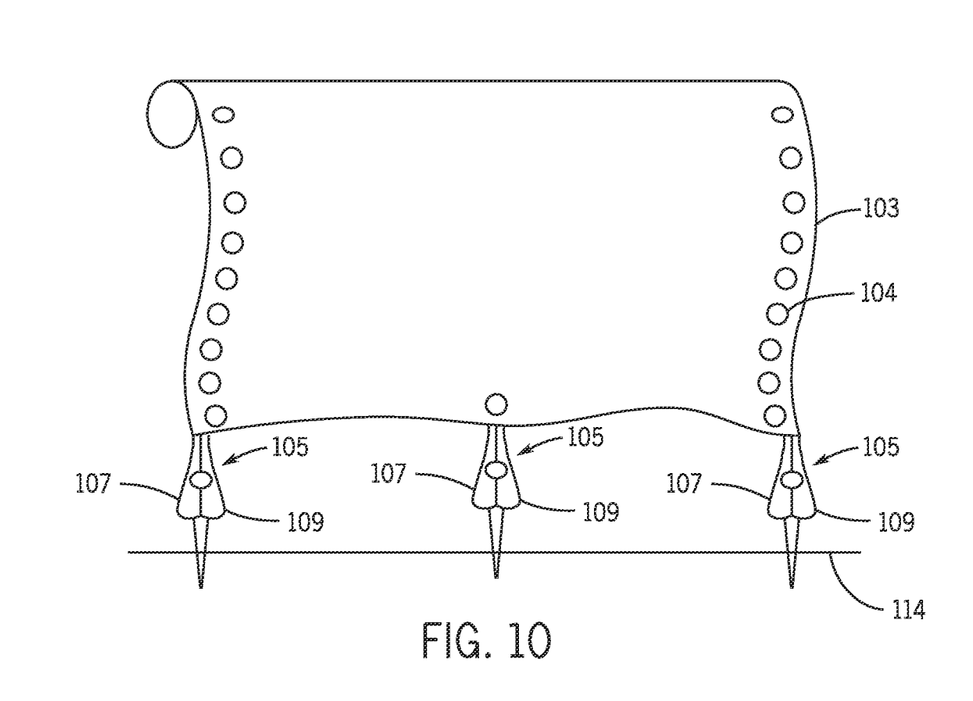
FIG. 10 is a perspective view of the retractable shelter secured by straps to stakes in the ground.

Directing attention to FIG. 10, embodiments of the present invention can be secured to stakes through the use of breakaway attachment straps 105. FIG. 9 shows a perspective view of retractable shelter 100 secured by straps 105 to stakes in the ground. As described above in FIG. 2, in an embodiment, straps 105 are a two-part hook-and-loop system having paired strap members 107 and 109, each having one of the two-part hook-and-loop attachment pair such as found in Velcro™ products. When securing retractable shelter 100 to stakes driven into ground 114, straps 105 are placed around the eye of a tent stake, so that the hook-and-loop material of strap members 107 and 109 are secured to each other to form a loop through the eye of tent stake 906.

Figure 11:
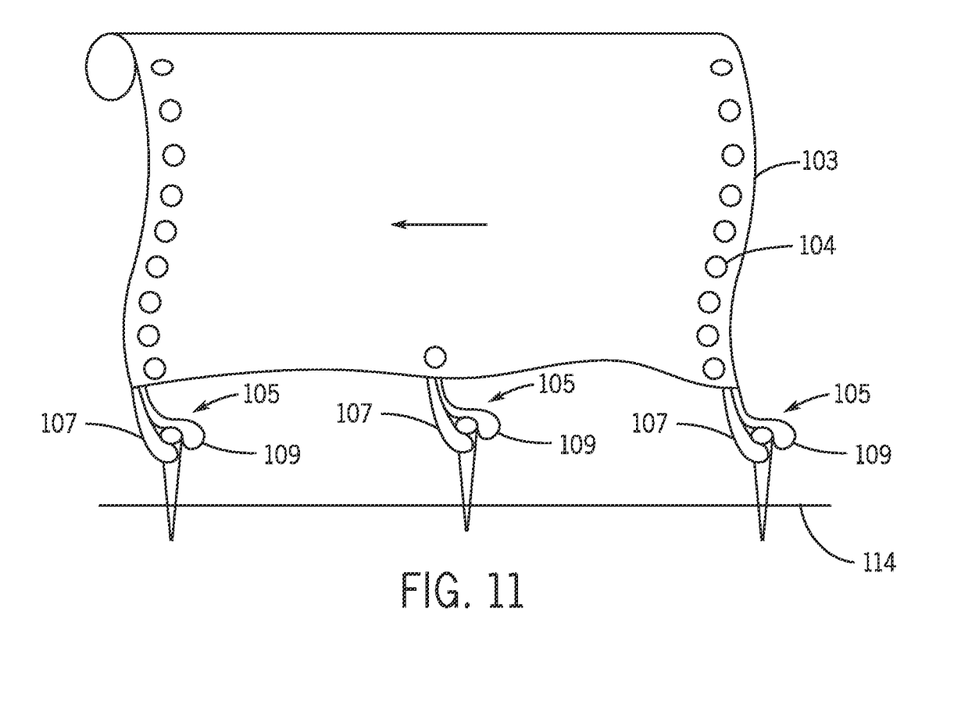
FIG. 11 is a perspective view of the retractable shelter secured by straps of FIG. 10, with the straps under strain as the slideout is accidentally moved before the shelter is retracted.

FIG. 11 shows the perspective view of FIG. 10 with straps 105 under strain as slideout 12 is accidentally moved before retractable shelter 100 is retracted. As depicted, strap members 107 and 109 are still fastened together, but strained from the force of slideout 12 moving to the left.

Figure 12:
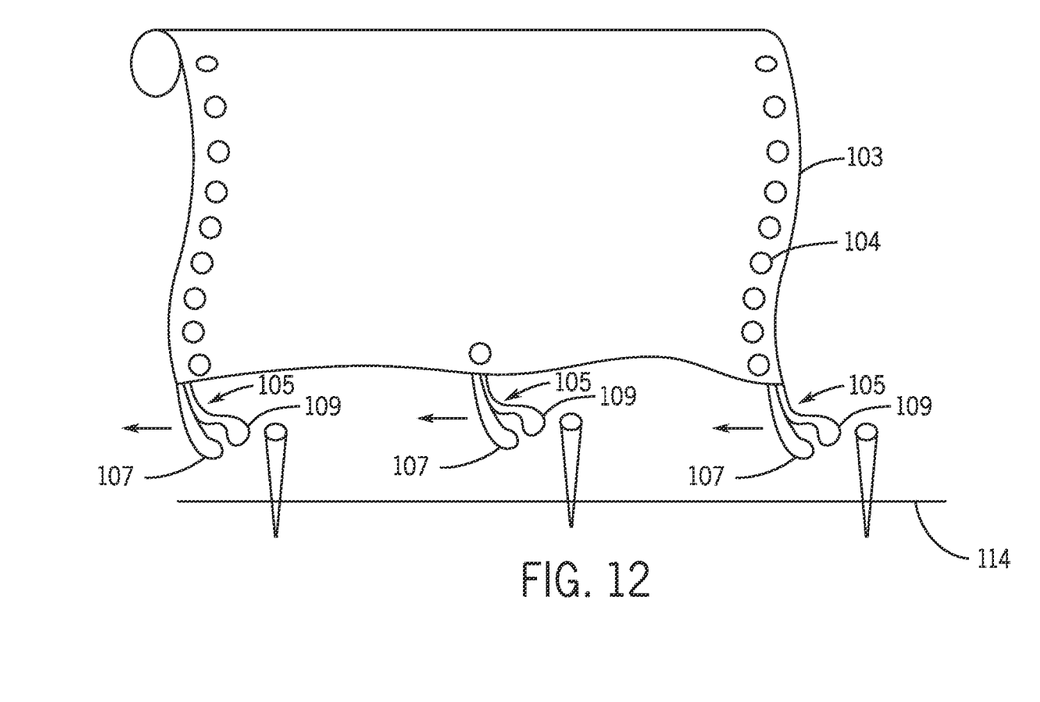
FIG. 12 is a perspective view of the retractable shelter of FIGS. 10-11 after the straps break free from the stakes in the ground.

FIG. 12 shows the perspective view of FIGS. 10-11 after straps 105 break free from the stakes 906 in the ground 114. By using strap member 902 and 904 in a hook-an-loop configuration to secure retractable shelter 100 to ground 114, when retractable shelter 100 is under excessive strain, strap members 107 and 109 are pulled apart, thus releasing the strain exerted on retractable shelter 100 and slideout 12 before they are damaged. For example, without the strap members 107 and 109, retractable shelter 100 could tear, or be ripped from slideout 12, or place enough torque on slideout 12 that it cannot be retracted, thus requiring expensive repairs.

While a retractable shelter for RV slideouts has been described and illustrated in detail in the various preferred embodiments, it is to be understood that numerous modifications and changes can be made to the present invention without departing from the scope and spirit thereof as set forth in the following claims.

What is claimed is:

1. A retractable shelter for use with a slideout compartment of a recreational vehicle, the retractable shelter comprising:
a sheet of flexible material capable of being rolled up into a retracted position; and
a storage compartment storing the sheet of flexible material when the sheet of flexible material is rolled up into the retracted position,
the storage compartment being attachable along and near a bottom edge of a slideout compartment of a recreational vehicle, the slideout compartment being movable from a withdrawn position to an expanded position in which an interior living area of the recreational vehicle is enlarged, the storage compartment being secured along and near the bottom edge of the slideout compartment in both the withdrawn and expanded positions when attached to the slideout compartment, wherein the sheet of flexible material is unrolled from the storage compartment when the slideout compartment is in the expanded position so that a leading edge of the flexible sheet of material moves away from the storage compartment when the flexible sheet of material is unrolled so that the flexible sheet of material and a lower surface of the slideout compartment cooperate to form a shelter.

2. The retractable shelter of claim 1,
wherein the leading edge of the sheet of flexible material includes securing straps incorporated at a plurality of points along its length.

3. The retractable shelter of claim 2, wherein:
the securing straps are configured in pairs that can be fastened to each other around a securing stake placed in the ground below the slideout compartment.

4. The retractable shelter of claim 3, wherein:
the securing straps incorporate a hook-and-loop fastener system.

5. The retractable shelter of claim 3, wherein;
the securing straps are configured to attach to each other in a breakaway configuration such that retracting the slideout compartment pulls the securing straps apart from each other.

6. The retractable shelter of claim 1, further comprising:
a pair of doors fastened to the flexible sheet when the flexible sheet is unrolled from the storage compartment into an extended position.

7. The shelter of claim 1, further comprising:
a pair of poles fastened to the flexible sheet when the flexible sheet is unrolled from the storage compartment into an extended position.

8. The retractable shelter of claim 1, wherein at least a portion of the flexible sheet is transparent.

9. The retractable shelter of claim 1,
wherein the flexible sheet includes first and second side edges and that along with the leading edge define a periphery of the flexible sheet of material when unrolled from the storage compartment into an extended position, and
wherein the first and second side edges and leading edge include securing points placed along the periphery.

10. The retractable shelter of claim 9, wherein the securing points include apertures configured to accept support poles when the flexible sheet is unrolled from the storage compartment in a substantially horizontal direction.

11. The shelter of claim 9, wherein the securing points include apertures configured to accept a securing line.

12. A method of providing a shelter on a recreational vehicle, the method comprising:
extending a slideout compartment from a recreational vehicle from a withdrawn position to an extended position to increase living space within the recreational vehicle;
providing a rolled-up sheet of flexible material stored in a storage compartment attached along and near a bottom edge of the slideout compartment on the recreational vehicle;
unrolling a portion of the rolled-up sheet of flexible material from the storage compartment;
extending the sheet of flexible material away from the bottom edge of the slideout compartment while the slideout compartment is in the extended position; and
securing at least a leading edge of the portion of the rolled up sheet of flexible material to ground generally below the slideout compartment so that the extended sheet of flexible material and slideout compartment cooperate to form a shelter.

13. The method of claim 12, wherein:
extending the sheet includes extending the sheet vertically downward to the ground.

14. The method of claim 12, wherein:
extending the sheet of flexible material includes extending the sheet of flexible material outward from the slideout compartment and then downward relative to the bottom edge of the slideout compartment to the ground to form a lean-to shelter.

15. The method of claim 12, further including:
attaching doors to the extended sheet of flexible material underneath the slideout compartment.

16. The method of claim 12, wherein:
extending the sheet includes extending the sheet in a horizontal direction to support poles.

17. The method of claim 12, wherein:
extending the sheet also includes extending the sheet downward along support poles to form a roof and vertical wall connected to the roof.

18. The method of claim 12, wherein securing at least the leading edge of the sheet of flexible material to ground generally below the slideout compartment includes:
securing the leading edge of the sheet of flexible material to stakes placed in the ground.

19. The method of claim 12, wherein securing at least the leading edge of the sheet of flexible material to ground generally below the slideout compartment includes:
providing securing straps configured in pairs along the leading edge of the sheet of flexible material, and securing the straps to each other around a stake.

20. The method of claim 19, wherein;
the straps are configured to attach to each other in a breakaway configuration such that retracting the slideout compartment pulls the straps apart from each other.

\* \* \* \* \*